Figure 1:
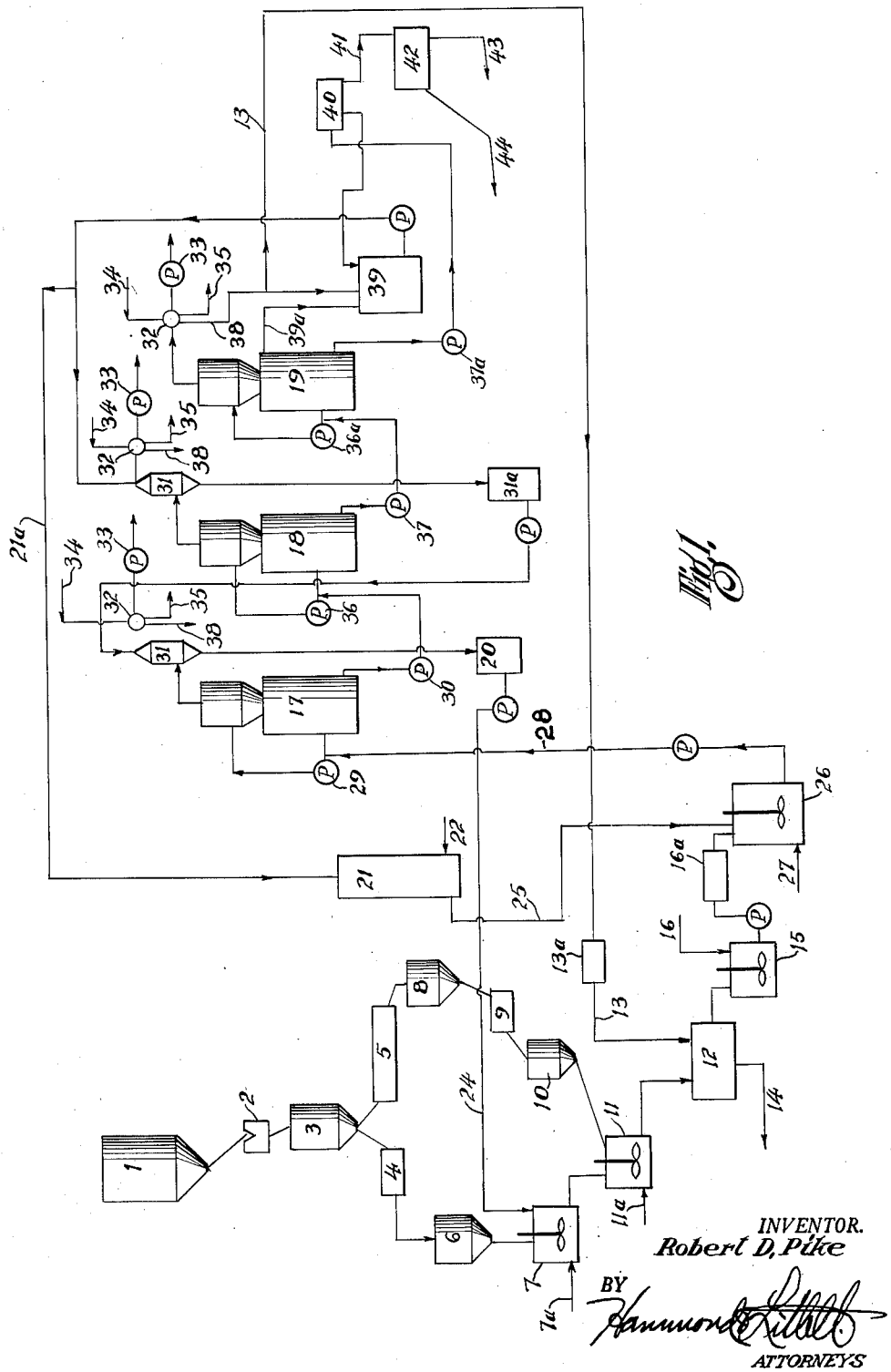

May 14, 1957 R. D. PIKE 2,792,282
METHOD OF PRODUCING REFINED SODA ASH FROM TRONA
Filed Feb. 11, 1953 2 Sheets-Sheet 1

INVENTOR.
Robert D. Pike
BY
Hammond Littell
ATTORNEYS

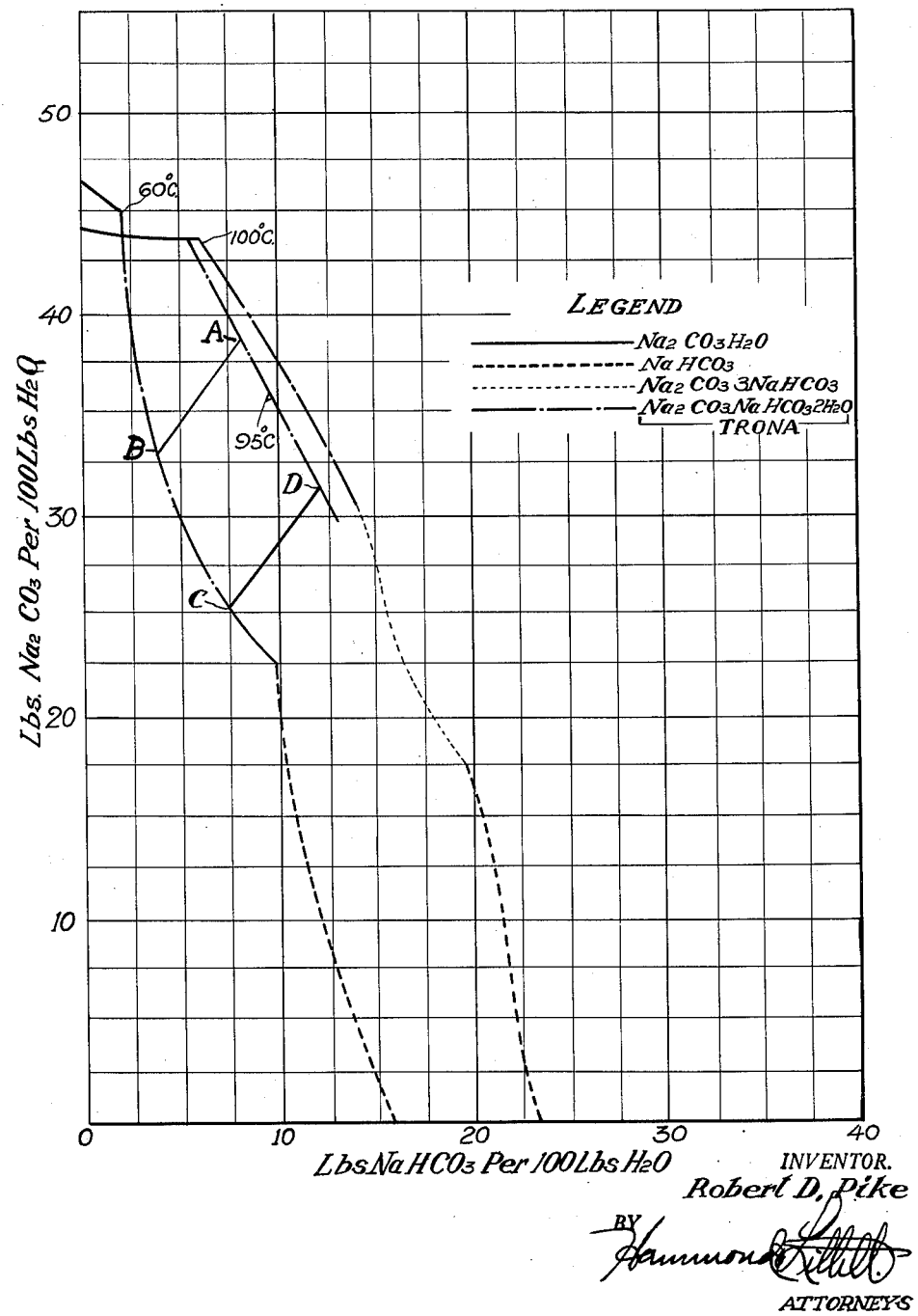

United States Patent Office 2,792,282
Patented May 14, 1957

2,792,282

METHOD OF PRODUCING REFINED SODA ASH FROM TRONA

Robert D. Pike, Greenwich, Conn.; Kenneth B. Ray and The Stamford Trust Company, executors of said Robert D. Pike, deceased Application February 11, 1953, Serial No. 336,321

7 Claims. (Cl. 23—38)

This invention relates to the production of sodium sesquicarbonate and soda ash from Wyoming trona by solution, purification and recrystallization of the trona. It constitutes an improvement on the process described in United States Patent No. 2,346,140, issued April 4, 1944, and is in part a continuation of my application S. N. 107,529, filed July 29, 1949, now Patent No. 2,639,217.

The objects of this invention are to increase the output of a given set of crystallizers by approximately 50% and at the same time produce crystals of sodium sesquicarbonate from trona of increased size and of such a low content of sodium chloride and sodium sulfate as to be classed as chemically pure.

A further object is to produce a very pure colorless soda ash by calcining the crystals of sodium sesquicarbonate, in which the crystals retain much the same size as in the sesquicarbonate produced.

Various other object and advantages will appear as this description proceeds.

Wyoming trona, based on an average analysis applied to about 60,000 tons of mined material, shows the following approximate composition: $Na_2CO_3$, 45.2; $NaHCO_3$, 36.4; $NaCl$, .08; $Na_2SO_4$, .044; $Fe_2O_3$, .0924; $H_2O$, 15.33; $H_2O$, insolubles about 2.9. In the crude material there is a slight deficiency of $Na_2CO_3$ as compared with the theoretical analysis of trona which is the same as sodium sesquicarbonate $Na_2CO_3$, $NaHCO_3$, $2H_2O$.

The invention may be better understood by reference to the accompanying drawing which illustrates in Fig. 1 a diagrammatic application of the process in a commercial plant, and in Fig. 2, the solubility diagram of the system $Na_2CO_3$, $NaHCO_3$, $H_2O$ within the temperature range from 95° C. to 60° C., which range I prefer to use for the production of crystals of sodium sesquicarbonate.

The invention is predicated upon my discovery that by removing a small part, as for example 10% of the net flow of mother liquor at 60° C. after the deposition of the crystals and by treating this minor portion with $CO_2$ to produce crystals of sodium bicarbonate, which slurry of mother liquor and bicarbonate crystals is then recombined with the main feed stream which has been supplied with a mixture of crude trona and calcined crude trona, I accomplish the desired object of increasing the capacity in the crystallizers and making larger crystals of the sesquicarbonate.

When the process is practiced according to the embodiment illustrated in Fig. 1, raw trona stored in the bin 1 is passed through the crusher 2 and goes to intermediate storage bin 3 from which about 62% goes through grinder 4, thence to storage bin 6 for crude ground trona. The balance, or about 38%, is calcined in calciner 5, the calcined material goes into an intermediate storage bin 8 and from there to a grinder 9 and a storage bin 10 for the ground calcined trona.

The main stream of mother liquor goes through line 24 into dissolver 7 where means are provided either by heating the dissolver itself or by heating the stream in the line 24 to raise the temperature from about 73° C. to about 95° C. or atmospheric boiling temperature. The mother liquor stream in line 24 comprises about 90% of the total stream from the crystallizers, the balance, or 10%, having been diverted through the carbonator 21 in line 21a. The stream in the dissolver 7 is used to produce a saturated solution of crude ground trona at about 95° C. The feed stream in line 24 is made up of a water solution of the sodium carbonate and sodium bicarbonate, the former being in considerably greater concentration than the latter.

The solution from the dissolver 7, saturated with trona and at about 95° C., goes to the dissolver 11 in which the temperature is maintained at 95° C. to 100° C. by steam from the line 11a and to which the crude calcined trona from 10 is introduced. This in turn deposits some soluble carbonates with the insoluble residue from the trona which is filtered off in filter 12. In the filter 12 the residue is washed with boiling water from line 13 which has been heated to the boiling temperature by heater 13a and which is part of the total make-up water returned to the process. This dissolves the soluble material in the residue so that when the residue is discarded at 14, there is very little soluble material left in it.

A preferred alternative method of preventing loss of soluble carbonates from the solution is to add hot make-up water from the line 13 directly into the tank 7. In this case the effluent from tank 11 will contain little, if any, solid soluble carbonates and a simple wash will suffice to remove solubles in the filter 12.

The combined feed of liquor and water from the filter 12 goes to the activated carbon treating tank 15 where a small amount of activated carbon is introduced at 16 and after agitation and contact the activated carbon is filtered out in filter 16a. The remaining clarified solution, from which organic matter and coloring matter which would cause foaming in the crystallizers have been removed, goes to mixing and holding tank 26. Into this tank there is introduced through the line 25 from the carbonator 21 a slurry of crystals of sodium bicarbonate in mother liquor at 60° C. Live steam is added at 27 to raise the temperature to 100° C. or atmospheric boiling temperature. The $CO_2$ necessary to produce the crystals of bicarbonate in the carbonator 21 is introduced through the line 22 from the calciners 42.

The combined material from the mixing and holding tank 26 flows to the first crystallizer 17 through the line 28 and is delivered into the suction of the circulating pump 29 which causes recirculation of the slurry in the first crystallizer.

The pump 30 removes from circulation of the crystallizer 17 the feed to the second crystallizer 18 at about 83° C. and delivers it to the suction of the pump 36 which acts to recirculate the slurry in the crystallizer 18. The pump 37 removes the feed to the third crystallizer 19 from the recirculation of the crystallizer 18 at about 71° C. and delivers it into the suction of the pump 36a which causes recirculation of the slurry in the third crystallizer 19. The pump 37a removes the mother liquor and crystals from the recirculation of the crystallizer 19 at about 60° C. and delivers this slurry, which contains all of the crystals of sodium sesquicarbonate which have been made in the process, to the centrifuge 40 via a settling vessel (not shown). These crystals are delivered at 41 to calciner 42 in which the crystals of sodium sesquicarbonate are calcined to soda ash and the $CO_2$ produced is delivered into the line 43 to be used for carbonation at 22.

The liquid from the centrifuge 40 goes to holding tank 39 for mother liquor in which tank the temperature is about 60° C. This tank also receives overflow mother liquor at 60° C. through the line 39a from the crystallizer 19 together with a portion of the make-up water from the condensate from the line 38 from surface condenser 32. The balance of this condensate goes through line 13 and is used as wash water in filter 12 or as additional make-up water in the tank 7. Whatever discard from the circulation which may be required to maintain the composition of the mother liquor, as described in application S. N. 107,529, may be removed from the liquid discharge from the centrifuge 40 en route to the tank 39, or at any other convenient point.

The vacuum pumps 33 connected with the tops of the three crystallizers 17, 18 and 19 maintain a vacuum in the crystallizers. In the crystallizer 19 all of the water vapor is condensed in the surface condenser 32 by cooling water from the spray pond flowing through line 34 and returning to the spray pond through line 35. The crystallizer 18 is connected to the barometric condenser 31 in which the condensing liquid is 90% of the mother liquor at 60° C. from the tank 39. The condensation which is not completed by barometric condenser 31 is completed by a small surface condenser 32. The discharge from the condenser 31 goes to holding tank 31a and is pumped to a barometric condenser 31 which is connected to the top of the crystallizer 17. By this reverse connection the temperature of the mother liquor used in the barometric condensers is higher in the first crystallizer than in the second crystallizer which creates less vacuum in the first crystallizer and maintains higher temperature than in the second crystallizer. The third crystallizer 19, which is served by the large surface condenser 32, has the highest vacuum and the lowest operating temperature, namely 60° C.

The effluent from the barometric condenser 31, which serves the crystallizer 17, goes to holding tank 20 at about 73° C. and is in turn delivered to the dissolver tank 7 where the temperature is raised to about 95° C. by steam from the line 7a and additional trona is dissolved therein.

In the following example of the process, solution of trona and crystallization of sodium sesquicarbonate take place between the temperatures of about 95° C. and 60° C. as illustrated on the solubility diagram of Fig. 2.

EXAMPLE

This example is based upon an overall temperature gap in the crystallizer operation of from 60° C. to 95° C., the extra 5° C. in tank 26, which is held at about 100° C., or atmospheric boiling temperature, being considered as superheat.

The equilibrium conditions at 60° C. and 95° C. of $Na_2CO_3$, $NaHCO_3$, per 100 lbs. $H_2O$ as shown by the line CD on Fig. 2 and by Table 1 is as follows:

Table 1

| Component | 60° C. | | | 95° C. | | |
|---|---|---|---|---|---|---|
| | Lbs./100 Lbs. $H_2O$ | Percent | Mol Ratio | Lbs./100 Lbs. $H_2O$ | Percent | Mol Ratio: $\frac{Na_2CO_3}{NaHCO_3}$ |
| $Na_2CO_3$ | 25.5 | 19.15 | } 2.63 | 31.5 | 21.9 | } 1.99 |
| $NaHCO_3$ | 7.7 | 5.78 | | 12.5 | 8.68 | |
| $H_2O$ | 100.0 | 75.07 | | 100.0 | 69.42 | |

The specific gravity of the solution is about 1.23 at 60° C.

The line AB on Fig. 2 is similar to the line CD and is shown so as to indicate that the process herein described can be carried out with use of a circulating mother liquor containing a considerably higher mol ratio of $Na_2CO_3$ to $NaHCO_3$ and higher amounts of $Na_2CO_3$ than shown in Table 1 above and indicated by the line CD.

The production of crystals of sodium sesquicarbonate in cooling from 95° C. to 60° C. along the line DC is about 12.85 lbs./100 lbs. $H_2O$. Water is evaporated in the operation of the crystallizer corresponding to the temperature gap of 35° C. The difference in enthalpy, expressed as B. t. u./100 lbs. $H_2O$, is about 6500 B. t. u. The latent heat of water is about 970 B. t. u./lb. Therefore lbs. water evaporated per 100 lbs. $H_2O$ is $$\frac{6500}{970} = 6.7$$

but as some heat passes out through the walls of the crystallizer, it may be assumed that only 75% of the theoretical amount is evaporated, giving an evaporation of 5 lbs. This leaves 95 lbs. $H_2O$ so that about 5% of the 25.5 lbs. $Na_2CO_3$ per 100 lbs. water at 60° C., or 1.275 lbs., will crystallize out due to this evaporation, producing 2.49 lbs. sesquicarbonate, giving a total production of $12.85 + 2.49 = 15.34$ lbs. of sesquicarbonate per 100 lbs. water, of which about 16.2% is due to evaporation per se.

The production of crystals in terms of mother liquor at 60° C. after restoring the water which was evaporated is $.7507 \times 15.34 = 11.5\%$, and in terms of the saturated feed at 95° C., $.6942 \times 15.34 = 10.65\%$.

After the evaporation and restoration of the water, the mother liquor at 60° C. has about the following composition:

Table 2

| Component | Lbs./100 Lbs. $H_2O$ | Percent | Mol Ratio |
|---|---|---|---|
| $Na_2CO_3$ | 24.225 | 18.5 | } 2.83 |
| $NaHCO_3$ | 6.775 | 5.17 | |
| $H_2O$ | 100.0 | 76.33 | |

When 10% of the circulating mother liquor leaving the third crystallizer at about 60° C. is treated with $CO_2$ in carbonator 21, the equation is:

(A) 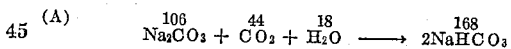
$$\underset{106}{Na_2CO_3} + \underset{44}{CO_2} + \underset{18}{H_2O} \longrightarrow \underset{168}{2NaHCO_3}$$

When 9.25 lbs. $CO_2$ are absorbed per 100 lbs. $H_2O$ while keeping the temperature at 60° C., this results in 22.2 lbs. $Na_2CO_3$ and 3.8 lbs. $H_2O$ disappearing and 35.27 lbs. $NaHCO_3$ being formed. The material present in carbonator 21 is now:

Table 3

| Component: | Lbs./100 lbs. $H_2O$ |
|---|---|
| $Na_2CO_3$ | $24.225 - 22.2 = 2.025$ |
| $NaHCO_3$ | $6.775 + 35.27 = 42.045$ |
| $H_2O$ | $100 - 3.8 = 96.2$ |

If the 3.8 lbs. make-up water which were consumed in the reaction are added through line 13, or otherwise, the figures in Table 3 can be considered as relating to 100 lbs. water. At this concentration of $Na_2CO_3$ (namely 2.02 lbs. per 100 lbs. $H_2O$) the solution in equilibrium with sodium bicarbonate at 60° C. contains 15 lbs. per 100 lbs. $H_2O$ of the bicarbonate, so that the amount of bicarbonate which crystallizes out as a result of absorbing 9.25 lbs. $CO_2$ is $42.045 - 15 = 27.045$ lbs./100 lbs. $H_2O$ in the mother liquor of Table 3 at 60° C. In other words, the stream leaving the carbonator 21 contains 2.025 lbs. $Na_2CO_3$, 15 lbs. $NaHCO_3$ in solution and 27.045 lbs. $NaHCO_3$ in solid or slurry form per 100 lbs. $H_2O$.

As the 100 lbs. of $H_2O$ of Table 3 is 10% of the $H_2O$ in the total stream of mother liquor leaving the crystallizer 19 at 60° C., the remainder will contain 900 lbs.

H₂O and, after dissolving the crude trona to saturation in tank 7 at 95° C., contains the following ingredients:

Table 4

| Component: | Total lbs. |
|---|---|
| $Na_2CO_3$ | 9×31.5=283 |
| $NaHCO_3$ | 9×12.5=112.5 |
| $H_2O$ | 900 |
| Total lbs. | 1295.5 |

The crude calcined trona which is added at 7 or 11 is therefore added to a feed stream of the composition shown in Table 4.

If the normal process of vacuum crystallization were used on all of the feed stream containing 1,000 lbs. H₂O, the crystals produced would be $$\frac{.1065 \times 1295.5}{.9} = 153.3 \text{ lbs. per 1,000 lbs. } H_2O$$

The CO₂ used for carbonating the diverted stream amounted to 9.25 lbs. which, in terms of crystals produced before making full allowance for additional production due to the process, is $$\frac{9.25}{153.5} \times 100 = 6.03\%$$

This amount of CO₂ can be obtained from the calciner 42 in which the crystals are calcined in accordance with the reaction (B)
$$2Na_2CO_3.NaHCO_3 2H_2O \rightarrow CO_2 + 3H_2O + 3Na_2CO_3$$

This reaction yields 9.7% CO₂ based on the crystals of sesquicarbonate calcined. This is more than sufficient CO₂ to provide the amount necessary to carbonate the diverted 10% of the mother liquor and as the extra production of sesquicarbonate crystals due to this process is about 50% greater than by the normal process of vacuum crystallization from a given set of crystallizers, an even greater amount of CO₂ is produced in the calciner 42 if all the sesquicarbonate crystals are calcined.

The diverted 10% stream, after carbonation in 21 and after the addition of 3.8 lbs. of make-up water, has the following composition:

Table 5

| Component: | Lbs./100 lbs. water |
|---|---|
| $Na_2CO_3$ | 2.025 |
| $NaHCO_3$ | 15.0 |
| $NaHCO_3$ crystals | 27.045 |
| $H_2O$ | 100.0 |

The recombined net feed stream in the tank 26 before allowing for the addition of calcined trona, therefore, has the following composition:

Table 6

| Component: | Total lbs. |
|---|---|
| $Na_2CO_3$ | 283+2.025=285.03 |
| $NaHCO_3$ | 112.5+15=127.5 |
| $NaHCO_3$ crystals | 27.045 |
| $H_2O$ | 1000.0 |

The 27.5 lbs. of crystals of sodium bicarbonate react in the tank 26 and in the flow through the crystallizers to form sesquicarbonate as follows:

(C) 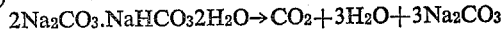

$$\underset{84}{NaHCO_3}(solid) + \underset{106}{Na_2CO_3} + \underset{36}{2H_2O} = \underset{226}{Na_2CO_3.NaHCO_3.2H_2O}(solid)$$

This produces 72.8 lbs. sesquicarbonate crystals with the consumption of 34.2 lbs. Na₂CO₃ and 11.6 lbs. H₂O, which may be supplied as make-up water, requiring a total up to this point of about 15.4 lbs. H₂O as make-up.

When the carbonated diverted stream is returned to the crystallizer after reuniting with the 90% stream of the feed in tank 26 and its contained bicarbonate crystals reacted, there remains before the production of sesquicarbonate crystals by the normal reaction of the crystallizer and before allowing for the addition of calcined trona, the following:

Table 7

| Component | Lbs./1,000 Lbs. Water | Lbs./100 Lbs. Water | Percent | Mol Ratio: $\frac{Na_2CO_3}{NaHCO_3}$ |
|---|---|---|---|---|
| $Na_2CO_3$ | 285.03−34.2= 250.8 | 25.08 | 18.2 | |
| $NaHCO_3$ | 127.5 | 12.75 | 9.26 | 1.96 |
| Water | 1,000.0 | 100.0 | 75.54 | |

The amount of Na₂CO₃ which must be added as calcined crude trona to restore the analysis at 95° C. as given in Table 1 is 6.62 lbs. per 100 lbs. H₂O. This figure is arrived at as follows:

Table 1 shows 12.5 lbs. NaHCO₃ and as Table 7 shows .25 lb. more than this of NaHCO₃, the extra amount of Na₂CO₃ to react must be added, namely, $$.25 \times \frac{106}{84} = .316$$

In addition, there must be added 31.5−25.08=6.3 lbs., giving a total addition of 6.62 lbs. Na₂CO₃ per 100 lbs. water, or 66.2 lbs. in terms of the stream containing 1,000 lbs. H₂O as shown in Table 7. This gives a total of 250.8+66.2+127.5+1000=1444.5 lbs. in the feed stream, which will produce .1065×1444.5=153.8 lbs. crystals of sodium sesquicarbonate. These crystals are produced by the ordinary action of the crystallizers, and the total production is the sum of this plus that made by the reaction of Equation C, giving a total production of 153.8+72.8=226.6, giving an increase in production of 47% over that produced by normal crystallization of sodium sesquicarbonate from solution between 95° C. and 60° C.

The 66.2 lbs. Na₂CO₃ which is added as crude calcined trona corresponds to 93.2 lbs. sesquicarbonate and this in turn to about 98 lbs. crude trona. The 153.8 lbs. sesquicarbonate produced in the crystallizers in turn corresponds to 162 lbs. of crude trona. The total crude trona added is 98+162=260 per 1,000 lbs. water of which total amount 37.7% must be calcined before being introduced into the process.

It will be understood that sufficient water will be added in the carrying out of the process to allow for water losses so as to maintain the circulating mother liquor in a steady state of quantity and composition.

While I have described in detail one embodiment and example of my invention, it will be understood that the invention may be practiced and applied in other ways than specifically described and that various modifications and changes may be made from those described without departure from the principles of the invention or the scope of the appended claims.

I claim:

1. A process for producing soda ash from trona, which comprises dissolving raw trona and a lesser amount of calcined trona in a circulating aqueous mother liquor solution of sodium carbonate and sodium bicarbonate, said mother liquor solution being at about boiling temperature of the said solution, the normal carbonate being in materially higher concentration than the bicarbonate in said mother liquor; adding make-up water sufficient to maintain the circulation, adding to this solution a slurry of sodium bicarbonate crystals produced by carbonating a minor fraction of the circulating mother liquor solution, permitting the sodium bicarbonate in said slurry to react with sodium carbonate and water to produce sesquicarbonate, feeding the entire stream containing the raw trona, the calcined trona and the added slurry through vessels adapted to cool and crystallize sodium sesquicarbonate, removing the crystals of sodium sesquicarbonate, calcining removed crystals of sesquicarbonate to produce soda ash, returning the mother liquor to dissolve more crude and calcined trona, and withdrawing a fraction of said mother liquor for carbonation and reintroduction as specified above herein.

2. A cyclic process for producing refined crystals of sodium sesquicarbonate from trona which comprises dissolving trona in hot circulating mother liquor of sodium carbonate and sodium bicarbonate in which the concentration of the normal carbonate is materially higher than of the bicarbonate, removing water insoluble matter and coloring matter by adsorption and filtration, then crystallizing sodium sesquicarbonate from said solution by evaporating and cooling the solution, separating crystals of sodium sesquicarbonate from the cooled solution to form the mother liquor, recycling and re-heating said recyling mother liquor to dissolve more trona therein, adding make-up water sufficient to maintain the circulation, calcining about 38% of the total trona before dissolving in said mother liquor and adding to the stream of mother liquor containing the dissolved trona and calcined trona a sufficient amount of crystals of sodium bicarbonate so that the overall reaction in the cooling step results in the production of crystals of sodium sesquicarbonate.

3. A cyclic process for the production of soda ash from trona comprising dissolving raw trona and a substantial but lesser amount of calcined trona in a circulating stream containing a circulating mother liquor having a substantially higher concentration of sodium carbonate than sodium bicarbonate and having sodium sesquicarbonate as the stable external crystal phase, said circulating stream being heated to about boiling temperature and having added thereto make-up water sufficient to maintain the circulation, withdrawing from the cycle a minor fraction of mother liquor containing at least enough sodium carbonate convertible into sodium bicarbonate to maintain the circulating stream containing the dissolved trona and dissolved calcined trona as a liquor having sodium sesquicarbonate as the stable external crystal phase, carbonating the withdrawn liquor until a slurry of sodium bicarbonate crystals is formed and until at least sufficient sodium carbonate is converted to sodium bicarbonate such that the carbonated liquor when added to the circulating stream forms a stream having sodium sesquicarbonate as the stable external crystal phase, adding the formed carbonated product to the circulating stream in a quantity sufficient to form a circulating stream having sodium sesquicarbonate as the stable external crystal phase, flowing the circulating stream containing the trona, the calcined trona and the added carbonated product through a cooling and crystallizing zone to crystallize sodium sesquicarbonate, separating crystallized sodium sesquicarbonate from the cooled stream to form the mother liquor, calcining separated sesquicarbonate crystals to produce soda ash, and returning mother liquor to the cycle to dissolve additional trona and calcined trona.

4. A cyclic process for the production of soda ash from Wyoming trona comprising dissolving raw trona and a substantial but lesser amount of calcined trona in a circulating stream containing a circulating mother liquor having a substantially higher concentration of sodium carbonate than sodium bicarbonate and having sodium sesquicarbonate as the stable external crystal phase, said circulating stream being heated to about boiling temperature and having added thereto make-up water sufficient to maintain the circulation, separating insoluble materials from the stream, separately removing organic coloring matter from the stream by treatment with an adsorbent, removing the adsorbent from the stream, withdrawing from the cycle a minor fraction of mother liquor containing at least enough sodium carbonate convertible into sodium bicarbonate to maintain the circulating stream containing the dissolved trona and dissolved calcined trona as a liquor having sodium sesquicarbonate as the stable external crystal phase, carbonating the withdrawn liquor until a slurry of sodium bicarbonate crystals is formed and until at least sufficient sodium carbonate is converted to sodium bicarbonate such that the carbonated liquor when added to the circulating stream forms a stream having sodium sesquicarbonate as the stable external crystal phase, adding the formed carbonated product to the circulating stream in a quantity sufficient to form a circulating stream having sodium sesquicarbonate as the stable external crystal phase, flowing the circulating stream containing the trona, the calcined trona and the added carbonated product through a cooling and crystallizing zone to crystallize sodium sesquicarbonate, separating crystallized sodium sesquicarbonate from the cooled stream to form the mother liquor, calcining separated sesquicarbonate crystals to produce soda ash, and returning mother liquor to the cycle to dissolve additional trona and calcined trona.

5. A cyclic process for the production of soda ash from trona comprising dissolving raw trona and a substantial but lesser amount of calcined trona in a circulating stream containing a circulating mother liquor having a substantially higher concentration of sodium carbonate than sodium bicarbonate and having sodium sesquicarbonate as the stable external crystal phase, said circulating stream being heated to about boiling temperature and having added thereto make-up water sufficient to maintain the circulation, withdrawing from the cycle about 10% of mother, carbonating the withdrawn liquor with $CO_2$ until a slurry of sodium bicarbonate crystals is formed and until at least sufficient sodium carbonate is converted to sodium bicarbonate such that the carbonated liquor when added to the circulating stream forms a stream having sodium sesquicarbonate as the stable external crystal phase, adding the formed carbonated product to the circulating stream in a quantity sufficient to form a circulating stream having sodium sesquicarbonate as the stable external crystal phase, flowing the circulating stream containing the trona, the calcined trona and the added carbonated product through a cooling and crystallizing zone to crystallize sodium sesquicarbonate, separating crystallized sodium sesquicarbonate from the cooled stream to form the mother liquor, calcining separated sesquicarbonate crystals to produce soda ash, introducing carbon dioxide produced in the calcining of the separated sesquicarbonate crystals to the cycle to carbonate said withdrawn liquor, and returning mother liquor to dissolve additional trona and calcined trona.

6. A process for producing sodium sesquicarbonate from naturally occurring matter, which comprises dissolving raw trona and a substantial but lesser amount of calcined trona in a circulating stream containing a circulating mother liquor having a substantially higher concentration of sodium carbonate than sodium bicarbonate and having sodium sesquicarbonate as the stable external crystal phase, said circulating stream being heated to about boiling temperature and having added thereto make-up water sufficient to maintain the circulation, withdrawing from the cycle a minor fraction of mother liquor containing at least enough sodium carbonate convertible into sodium bicarbonate to maintain the circulating stream containing the dissolved trona and dissolved calcined trona as liquor having sodium sesquicarbonate as the stable crystal phase, carbonating the withdrawn liquor until a slurry of sodium bicarbonate crystals is formed and until at least sufficient sodium carbonate is converted to sodium bicarbonate such that the carbonated liquor when added to the circulating stream forms a stream having sodium sesquicarbonate as the stable external crystal phase, adding the formed carbonated product to the circulating stream in a quantity sufficient to form a circulating stream having sodium sesquicarbonate as the stable external crystal phase, flowing the circulating stream containing the trona, the calcined trona and the added carbonated product through a cooling and crystallizing zone to crystallize sodium sesquicarbonate, separating crystallized sodium sesquicarbonate from the cooled stream to form the mother liquor, and returning mother liquor to the cycle to dissolve additional trona and calcined trona.

7. A cyclic process for the production of sodium sesquicarbonate from trona comprising dissolving raw trona and calcined trona in a circulating stream until said circulating stream is substantially saturated with trona and calcined trona, said circulating stream containing a mother liquor having a substantially higher concentration of sodium carbonate than sodium bicarbonate which has sodium sesquicarbonate as the stable external crystal phase, said circulating stream being heated to about boiling temperature and having added thereto make-up water sufficient to maintain the circulation, separating insoluble materials from the stream, separately removing organic coloring matter from the stream by treatment with an adsorbent, removing the adsorbent from the stream, withdrawing from the cycle about 10% of mother liquor, carbonating the withdrawn liquor until a slurry of sodium bicarbonate crystals is formed and until at least sufficient sodium carbonate is converted to sodium bicarbonate such that the carbonated liquor when added to the circulating stream forms a stream having sodium sesquicarbonate as the stable external crystal phase, adding the formed carbonated product to the circulating stream in a quantity sufficient to form a circulating stream having sodium sesquicarbonate as the stable crystal phase, flowing the circulating stream containing the trona, the calcined trona and the added carbonated product through a cooling and crystallized zone to crystallize sodium sesquicarbonate, separating crystallized sodium sesquicarbonate from the cooled stream to form the mother liquor, and returning the mother liquor to the cycle to dissolve additional trona and calcined trona.

References Cited in the file of this patent

UNITED STATES PATENTS

| | | |
|---|---|---|
| 1,319,128 | Watson | Oct. 21, 1919 |
| 1,618,834 | Kuhnert | Feb. 22, 1927 |
| 2,346,140 | Pike | Apr. 11, 1944 |
| 2,639,217 | Pike | May 19, 1953 |